UNITED STATES PATENT OFFICE.

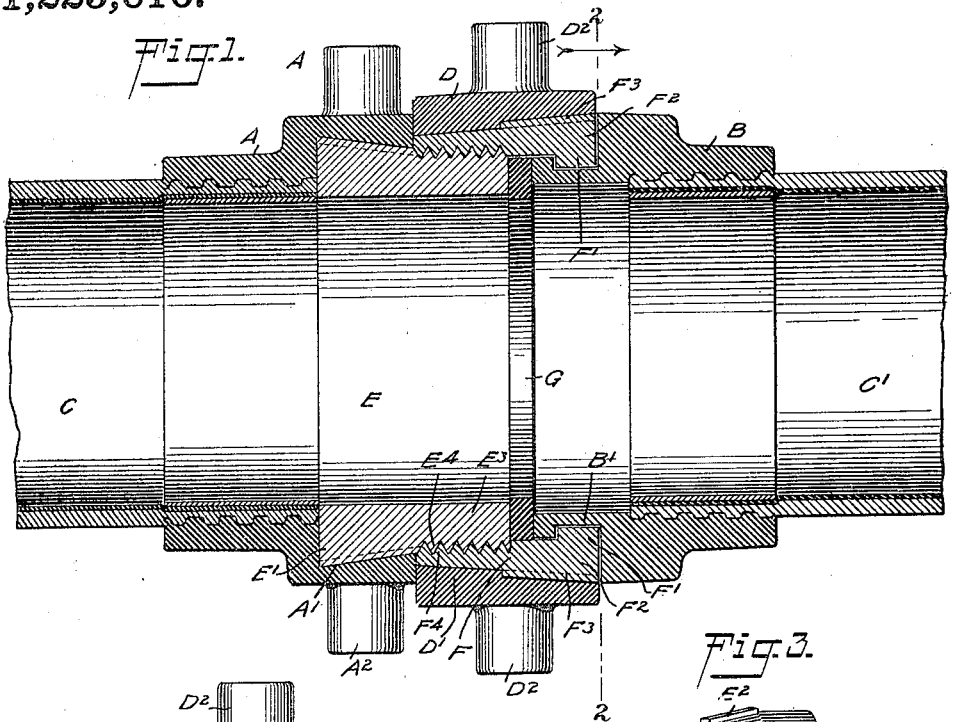
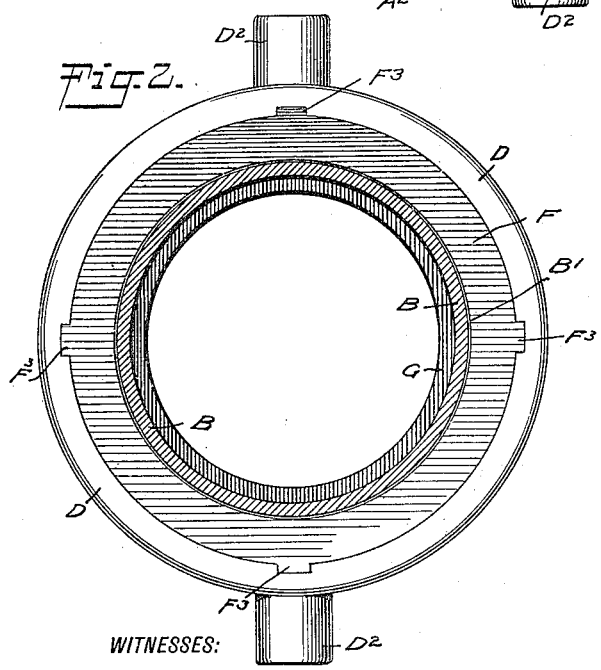
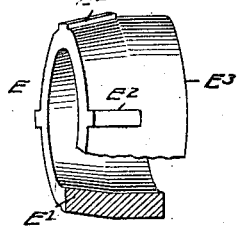
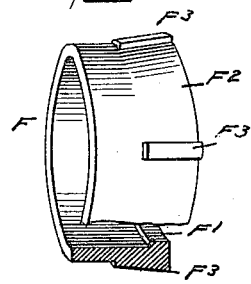
W. R. GOUGH, DEC'D.
I. V. GOUGH, ADMINISTRATRIX
FIRE HOSE COUPLING.
APPLICATION FILED MAY 27, 1915.
1,225,616. Patented May 8, 1917.
INVENTOR
William R. Gough.

WILLIAM R. GOUGH, OF BROOKLYN, NEW YORK; ISABELLE V. GOUGH ADMINISTRATRIX OF SAID WILLIAM R. GOUGH, DECEASED.

FIRE-HOSE COUPLING.

1,225,616.  Specification of Letters Patent.  Patented May 8, 1917.

Application filed May 27, 1915. Serial No. 30,782.

*To all whom it may concern:*

Be it known that I, WILLIAM R. GOUGH, a citizen of the United States, and a resident of the city of New York, borough of Brooklyn, in the county of Kings and State of New York, have invented a new and Improved Fire-Hose Coupling, of which the following is a full, clear, and exact description.

The object of the invention is to provide a new and improved fire hose coupling arranged to present to all outside appearances a cheap, ordinary, malleable iron coupling, at the same time providing a coupling with interior, invisibly engaging threaded bushings of brass to prevent undue corrosion by the passage of water through the coupling.

The purpose of this apparently cheap iron coupling is to meet and overcome a prevailing condition described below. The expensive brass couplings now in use in connection with interior fire protection equipment in factory, loft and office buildings, apartment houses, hotels, theaters, etc., offer an incentive for stealing and selling these couplings by unscrupulous persons. The equipment referred to is usually placed in little frequented parts of buildings, making theft of these couplings comparatively easy, consequently leaving the buildings devoid of the intended protection against fire, thus endangering the lives of persons employed in or occupying such buildings. By installing these apparently cheap, iron couplings instead of expensive brass couplings, the incentive for theft and resultant danger is removed.

In order to accomplish the desired result, use is made of coupling heads and a coupling member, the heads and coupling member being made of low priced metal such as malleable iron, pressed steel or the like, and the said coupling member being mounted to turn loosely on one of the coupling heads, the other coupling head and the coupling member having interior brass bushings provided with screw threads engaging one the other.

A practical embodiment of the invention is represented in the accompanying drawings forming a part of this specification in which similar characters of reference indicate corresponding parts in all the views.

Figure 1 is a longitudinal central section of the hose coupling;

Fig. 2 is a cross section of the same on the line 2—2 of Fig. 1;

Fig. 3 is a perspective view with a portion broken out of the blank for the bushing of the coupling head with parts in position prior to expanding the bushing and cutting the thread thereon; and Fig. 4 is a similar view of the blank for the other bushing prior to pressing it in position in the coupling member and cutting the thread thereon.

In its general construction, the hose coupling consists of coupling heads A and B to which the adjacent ends of the hose sections C and C' are attached in the usual manner, and a coupling member D for connecting the heads A and B with each other. The coupling heads A and B and the coupling member D are made of cast iron, pressed steel or other similar cheap metal, and the coupling head A and the coupling member D are provided with bushings E and F made of brass adapted to be screwed together, as hereinafter more fully explained. The bushing E is provided with an inner conical portion E' expanded by a suitable expanding device into a conical seat A' formed in the end of the coupling head A, the conical seat A' having its apex at the face of the coupling head A so that when the bushing is expanded into place in the seat A' then it cannot pull out. In order to prevent the bushing E from turning in the seat A' use is made of longitudinally extending lugs or ribs E² formed integrally on the conical portion E' and engaging corresponding recesses in the wall of the seat A'. The bushing E is provided with an outer portion E³ projecting beyond the face of the coupling head A and being provided with an exterior screw thread E⁴. The bushing F of the coupling member D is provided on its inner end with an inwardly extending annular flange F' engaging a correspondingly shaped annular groove B' formed in the coupling head B so as to allow the coupling member D to turn on the coupling head B. The bushing F is made conical at its exterior surface and fits into a correspondingly shaped conical opening D' formed in the coupling member D, the apex of the opening D' and the bushing F being at the face of the coupling head so that the two conical bushings E and F have their apexes extending toward each other. The rear portion F² of the bushing F is provided exteriorly with longitudinally extending lugs or ribs F³ engaging corresponding recesses in the wall of the opening D' to prevent the bushing F from turning in the coupling member D. The forward portion of the bushing F is provided with interior screw threads F⁴ screwing onto the screw threads E⁴ on turning the coupling member D to draw the coupling head B toward the coupling head A and to engage the face of the coupling head B with the usual rubber gasket G held on the outer end of the bushing E, as plainly shown in Fig. 1. It will be noticed that by the arrangement described the coupling member D can be readily turned to engage its screw thread F⁴ with the screw thread E⁴ with a view to fasten the coupling heads A and B together and to allow of unscrewing the coupling member D whenever it is desired to uncouple the heads A and B. The coupling head A and the coupling member D are provided with the usual short spanner lugs A², D² to permit of conveniently manipulating the said head and member when coupling or uncoupling the heads A and B.

It will be noticed that by the arrangement described the threads E⁴ and F⁴ are not liable to corrode by the action of the water passing through the hose and hence the long life of the coupling is insured. As the bushings E and F are invisible it is evident that the coupling appears as being made of but cheap metal and hence forms no attraction to unscrupulous persons for stealing the coupling.

It will further be noticed that by arranging the conical bushings with their apexes toward each other they are not liable to be pulled out of place in the head A and the coupling member D on screwing up or unscrewing the coupling member D.

Having thus described my invention, I claim as new and desire to secure by Letters Patent:

1. A hose coupling, comprising coupling heads and a coupling member, the said heads and coupling member being made of a low-priced metal and the said coupling member being mounted to turn loosely on one of the coupling heads, the other coupling head and the coupling member having interior brass bushings of which the brass bushing of the coupling head projects beyond the end thereof and is provided with an exterior screw thread, and the brass bushing of the coupling member is provided with an interior screw thread screwing onto the threaded projecting end of the other brass bushing.

2. A hose coupling, comprising coupling heads, a coupling member, the said heads and member being made of a low priced metal and the said coupling member being mounted to turn loosely on one of the said coupling heads, the other coupling head having a conical opening, the apex of which is at the face of this coupling member, a brass bushing having a conical inner end fitting the said seat and having an outer portion projecting beyond the face of this coupling member, the projecting end being provided with an exterior screw thread, the said coupling member having a conical opening throughout its length and with the apex on the inner face of the coupling member, and a conical bushing fitting into the said conical opening and having an interior screw thread screwing on the said exterior screw thread on the projecting end of the other bushing.

3. A hose coupling, comprising coupling heads, a coupling member, the said heads and member being made of a low priced metal and the said coupling member being mounted to turn loosely on one of the said coupling heads, the other coupling head having a conical opening, the apex of which is at the face of this coupling member, a brass bushing having a conical inner end fitting the said seat and having an outer portion projecting beyond the face of this coupling member, the projecting end being provided with an exterior screw thread, the said coupling member having a conical opening throughout its length and with the apex on the inner face of the coupling member, and a conical bushing fitting into the said conical opening and having an interior screw thread screwing on the said exterior screw thread on the projecting end of the other bushing, the said bushings having exterior lugs on the non-threaded portions fitting into recesses in the walls of the said seat and the said opening.

4. A hose coupling, comprising a pair of coupling heads and a coupling member, the said heads and member being made of pressed steel, and bushings of non-corrodible metal having screw threads screwing one on the other, one of the bushings being expanded in one of the coupling heads and the other being conical and pressed into a conical opening in the coupling member.

5. A hose coupling, comprising a pair of coupling heads and a coupling member, the said heads and member being made of pressed steel, and non-corrodible bushings having screw threads screwing one on the other, one of the bushings being expanded in one of the coupling heads and the other being conical and pressed into a conical opening in the coupling member, the said bushings having exterior lugs on the non-threaded portions engaging recesses in the walls of the corresponding coupling head and the coupling member.

6. A hose coupling, comprising coupling heads and a coupling member, one of the coupling heads having a conical seat with the apex thereof at the face of the coupling and the other coupling head having an exterior annular groove, the said coupling member having a conical opening, the apex of which is at the inner face of the coupling member, a bushing having a conical portion and an exteriorly threaded portion, of which the conical portion fits into the said seat and the threaded portion projects beyond the face of the coupling member having the said seat, and a second bushing having a conical exterior fitting into the opening of the coupling member and having an interior screw thread adapted to engage the said exterior screw thread on the first-named bushing, the said second bushing having at its outer end an inwardly extending annular flange engaging the said annular groove.

7. A hose coupling, comprising a pair of coupling heads and a coupling member for connecting the said heads with each other, one of the said coupling heads having a conical non-corrodible bushing and the said coupling member having a conical non-corrodible bushing, the apexes of the bushings extending toward each other and the bushings having coacting screw threads to screw the coupling member up on the corresponding coupling head.

8. A hose coupling, comprising a pair of coupling heads and a coupling member for connecting the said heads with each other, one of the said coupling heads having a conical non-corrodible bushing and the said coupling member having a conical non-corrodible bushing, the apexes of the bushings extending toward each other and the bushings having coacting screw threads to screw the coupling member up on the corresponding coupling head, the bushing in the coupling head being expanded into position and the bushing in the said coupling member being pressed into place.

In testimony whereof I have signed my name to this specification in the presence of two subscribing witnesses.

WILLIAM R. GOUGH.

Witnesses:
 THEO. G. HOSTER,
 PHILIP D. ROLLHAUS.

Copies of this patent may be obtained for five cents each, by addressing the "Commissioner of Patents, Washington, D. C."